Figure 1:
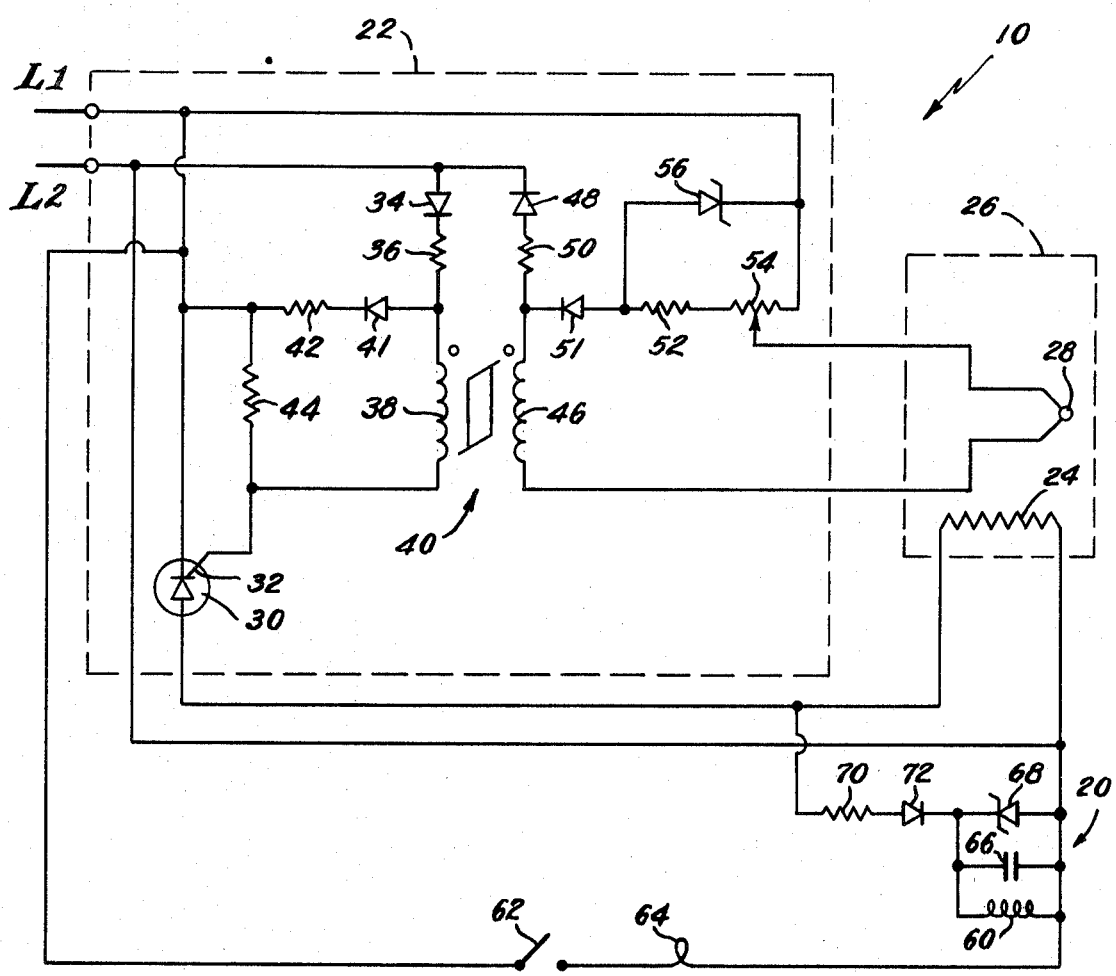

United States Patent

[11] 3,569,673

[72] Inventor Donald P. Clark
 South Attleboro, Mass.
[21] Appl. No. 803,769
[22] Filed Mar. 3, 1969
[45] Patented Mar. 9, 1971
[73] Assignee Texas Instruments Incorporated
 Dallas, Tex.

[54] TEMPERATURE CONTROL AND INDICATING SYSTEM
 9 Claims, 2 Drawing Figs.

[52] U.S. Cl. .................................... 219/501
[51] Int. Cl. ..................................... H05b 1/02
[50] Field of Search ........................... 219/248,
 453, 487, 506, 269, 109, 494, 497, 501

[56] References Cited
UNITED STATES PATENTS
| | | | |
|---|---|---|---|
| 3,256,734 | 6/1966 | Storke | 219/497 |
| 3,369,108 | 2/1968 | Strachan | 219/501 |
| 3,479,487 | 11/1969 | Stoll | 219/494 |

Primary Examiner—Bernard A. Gilheany
Assistant Examiner—F. E. Bell
Attorneys—Harold Levine, Edward J. Connors, Jr., John A. Haug, James P. Mc Andrews and Gerald B. Epstein ABSTRACT: A temperature control system is disclosed in which the energization of a heating element is selectively varied in order to control the temperature of a zone whose temperature is being maintained within preselected limits, while the power supplied to the heating element is monitored by an indicating system coupled to the heating element to provide a display representative of the amount of heat being supplied by the heating element. A silicon controlled rectifier (SCR) is utilized as a switch element for selectively energizing the heating element by varying the phase angle of triggering of the SCR. Triggering of the SCR is in turn dependent upon temperature sensed in the zone being heated. In instances where somewhat more accurate control of the temperature limits are desired a pair of silicon controlled rectifiers are provided for controlling the power supplied to the heating element during respective alternate half cycles of applied alternating current power. The indicating system includes at least one voltage responsive switch energizing means coupled to the heating element and to a switch, which, when energized by the voltage responsive means, effects energization of a suitable indicating device, such as an indicator light, to provide an indication of the temperature of the zone being controlled.

INVENTOR,
Donald P. Clark,

TEMPERATURE CONTROL AND INDICATING SYSTEM

This invention relates generally to a temperature control system and more particularly is directed to a temperature control system including a temperature indicating means.

Various types of temperature control systems are currently available in which the temperature in a zone to be controlled is maintained by producing a signal indicative of temperature sensed the zone for controlling the power supplied to a heating element coupled to the zone. However, such systems in certain instances may be somewhat limited in usefulness. For example, once the temperature levels within which the zone is to be maintained have been adjusted by appropriate arrangement of various of the circuit parameters of the system, it may be difficult to ascertain whether the system is functioning properly or has reached the desired mode of operation. Also it may be quite difficult to detect the temperature level of the zone being controlled with respect to temperature, since devices and systems of this nature may be extremely small in dimension and may be placed in a confined area. Consequently, gaining access to the system is often extremely difficult without disrupting the operation of the overall system. Accordingly, it is quite desirable to provide a system for conveniently furnishing an indication of the temperature level in the zone being controlled. It is particularly desirable to provide such a mechanism which does not interfere with the operation of the overall system or introduce inaccuracies.

It has been found that one particularly desirable manner for sensing the temperature in the zone being controlled, particularly in conjunction with a temperature control system, such as that described in U.S. Pat. No. 3,369,108, assigned to the assignee of the present application, involves sensing the amount of heating power being supplied to the zone as an indication of the temperature of the zone itself. In such a temperature control system, as described in detail in the aforementioned U.S. patent, the power being supplied to the zone is varied in response to the temperature sensed in the zone so that the zone may be maintained at a predetermined temperature level.

However, by sensing the power being supplied to the zone for maintaining the temperature at the desired level, it is possible to ascertain the temperature level in the zone, and to provide an appropriate indication of the temperature level. Consequently, an indication may be provided when the system has reached its desired operating temperature, thereby indicating to an operator that system operation is normal, or that desired operation cannot be achieved without undue strain on the system, etc.

Accordingly, it is an object of the present invention to provide a temperature control system in which an indication is provided of the state of operation of the system.

It is another object of the present invention to provide a temperature control system in which an indicating system is coupled to a heating element utilized to maintain a desired temperature level, in order to provide an indication of the amount of heat being supplied by the heating element.

It is still another object of the present invention to provide a temperature control system in which the amount of power being supplied to a resistive heating element is monitored to provide a visual indication of the state of operation of the system.

It is a further object of the present invention to provide a temperature control system in which the heating power supplied to a resistive heating element is controlled in response to the temperature sensed in a zone being maintained at a predetermined temperature level and a visual representation of the heating power is displayed as an indication of the temperature level in the zone.

It is still a further object of the present invention to provide a temperature control and indicating system which is inexpensive and durable in construction and is flexible and convenient to operate.

Figure 2:
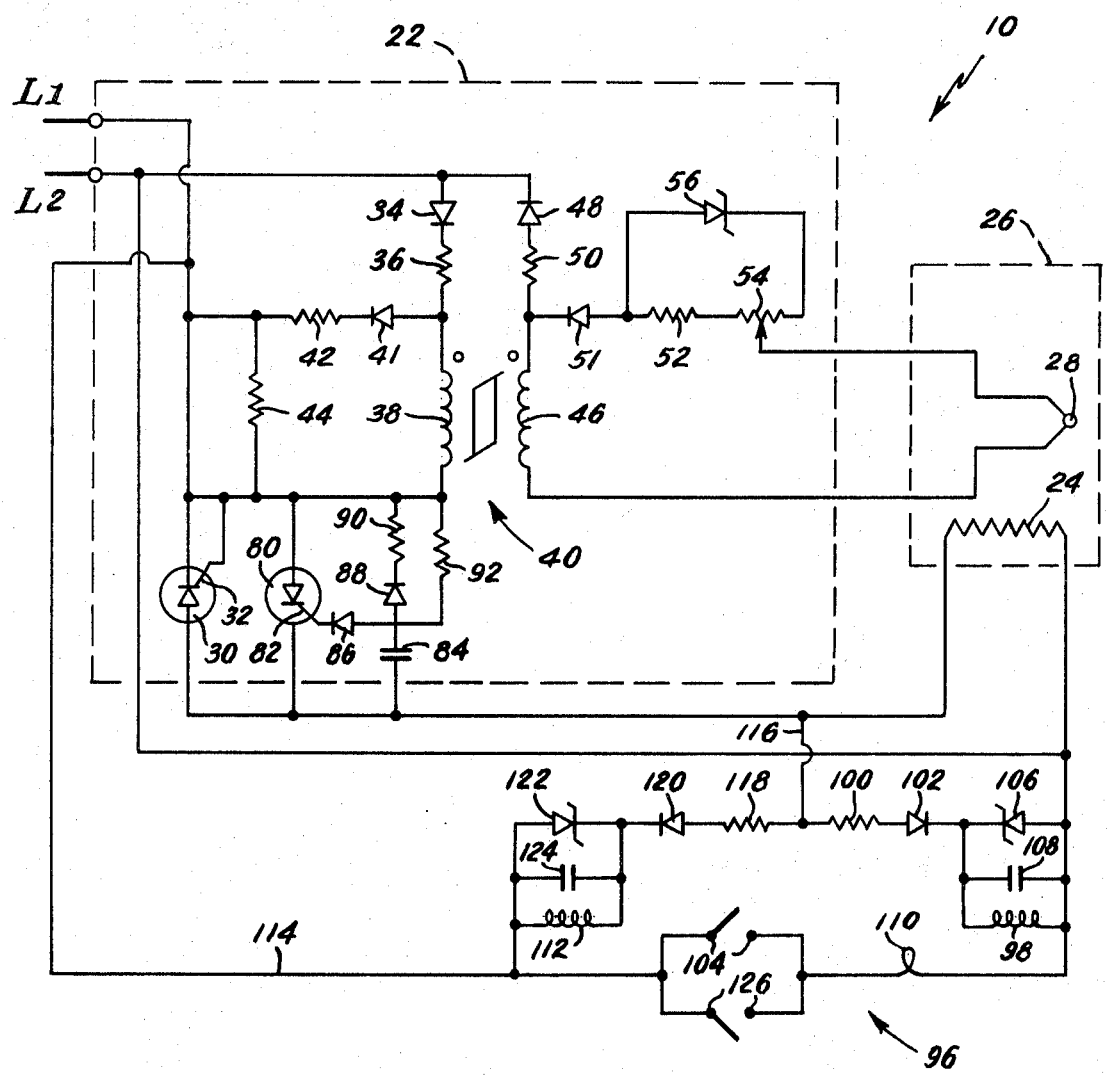

Other objects and advantages will become readily apparent from the following detailed description and accompanying drawings in which:

FIG. 1 is a schematic circuit diagram of one form of temperature control system in accordance with the present invention; and FIG. 2 is a schematic circuit diagram of another embodiment of a temperature control system in accordance with the principles of the present invention.

Very generally a temperature control system in accordance with the present invention may typically include a temperature controller, such as that set forth in the aforementioned U.S. Pat. No. 3,369,108. As explained in that patent, a resistive heating element is maintained in thermal communication with a zone whose temperature is to be controlled so as to adjust to the temperature in the zone. The heating element is selectively energized from a suitable power source through a switching device, such as a selectively triggerable silicon controlled rectifier, which controls the amount of power being supplied to the heating element and hence the amount of heat being supplied to the zone. In addition, a suitable temperature sensing device, such as a thermistor, is arranged in thermal communication with the zone for sensing its temperature, and is interconnected with the silicon controlled rectifier by a saturable reactor. The saturable reactor triggers the silicon controlled rectifier as a function of variations in the resistance of the thermistor, which senses the temperature in the zone being heated by the heating element. As a result, the proportion of time during which the silicon controlled rectifier supplies power to the heating element depends upon the temperature of the zone as sensed by the thermistor, and the temperature in the zone is thereby conveniently maintained within predetermined limits.

Referring to the drawings and particularly to FIG. 1, a temperature control system is illustrated, including a temperature controller 10, which is generally similar to the temperature controller illustrated in the aforementioned U.S. patent. In addition, a selectively energizable temperature indicating means 20 is coupled to the temperature controller for providing an indication of the state of operation of the temperature controller. The temperature indicating means 20 is arranged to monitor the amount of heating power supplied, so as to provide an indication of the amount of heat required to maintain the temperature controller operating at the desired temperature level and thereby provides a continuous indication of the temperature level which is maintained. The temperature indicating means is preferably arranged to provide a visual display representative of this temperature level.

Although a detailed description of the temperature controller is provided in the aforementioned U.S. patent, a brief summary is set forth herein. The temperature control system generally includes a suitable source of alternating current power (not shown) which is coupled to the control circuitry portion 22 of the temperature controller through power lines L1 and L2. The control circuitry portion 22 is arranged to adjust the level of heating power supplied to a heating element 24 so as to maintain the temperature within a zone 26, which is being heated, within preselected limits. The control circuitry 22 is also coupled to a heat sensing element 28, such as a thermistor, which senses the temperature within the zone 26. As the temperature in zone 26 varies, an electrical characteristic, such as the resistance of the thermistor 28 varies, and thereby affects the operation of the control circuitry portion 22 in response to the temperature being sensed within the zone 26.

The heating element 24 is provided with half wave rectified electrical power through a selectively energizable semiconductor switch 30 which preferably comprises a silicon controlled rectifier. The silicon controlled rectifier 30 is forward biased during alternating current half cycles of one polarity so that it may be rendered conductive by applying a suitable triggering signal to its gate electrode 32 in order to supply power from the source of alternating current power to the heating element 24. Similarly, the silicon controlled rectifier 30 is reverse biased or nonconducting during alternating current half cycles of the opposite polarity. The proportion of time during which power is supplied to the heating element 24 is conveniently adjusted by varying the firing angle of the silicon controlled rectifier 30 during the time interval in which it is forward biased. In particular, this triggering signal is made dependent upon the temperature in the zone 26 as sensed by the thermistor 28 so as to adjust the heating power supplied to the heating element 24 in accordance with the amount of heat being sensed by the thermistor 28.

Triggering signals are applied to the gate 32 of the silicon controlled rectifier 30 during alternating current half cycles of the one polarity through a series circuit including a diode 34, a resistor 36, and a first winding 38 of a saturable core reactor 40, having predetermined hysteresis characteristics, as explained in detail in the aforementioned U.S. patent. It may be noted from FIG. 1 that the cathode of the silicon controlled rectifier is coupled to the power line L1, while the previously mentioned series circuit, connected to the gate electrode 32 is arranged such that the anode of diode 34 is coupled to the other power line L2. Thus, during alternating current half cycles of the one polarity, the cathode-anode circuit of the silicon controlled rectifier will be forward biased, while the diode 34 is similarly forward biased in order to provide a triggering signal to the gate 32.

The triggering circuit is arranged in a voltage divider configuration in order to protect the gate 32 from high surges of power. The junction between the resistor 36 and the first winding 38 is coupled to the power line L1 by a diode 41 and a resistor 42, thereby limiting the voltage across the winding 38 and protecting the winding 38 from overloads. Further, a shunting resistor 44 is provided to shunt the gate-cathode circuit of the silicon controlled rectifier 30 and prevent inadvertent turn-on as a result of small transient currents flowing in the winding 38.

The saturable core reactor 40 also includes a second or reset winding 46, which is coupled to line L2 on alternating current half cycles of opposite polarity through a diode 48 and a resistor 50. It may be noted that diode 48 is connected in an opposite polarity configuration with respect to diode 34 so that line L2 energizes the windings 38 and 46 respectively through these diodes on respective alternate half cycles of applied alternating current power.

Winding 46 is also coupled to the thermistor 28 by a series connected diode 51, resistor 52, and potentiometer 54, with these latter mentioned elements cooperating with diode 48 and resistor 50 to define a voltage divider configuration. It may be noted that diode 51 is connected in the same polarity relationship as diode 48 so that current may be supplied through both of these serially connected elements on the half cycles of applied alternating current power which forward bias these diodes. In addition, a voltage limiting Zener diode 56 is connected in parallel across the resistor 52 and potentiometer 54 to limit the voltage across these elements.

Thermistor 28 is connected to the variable tap of potentiometer 54, while the winding 46 is coupled to the previously described voltage divider configuration. An adjustable portion of the constant voltage across the resistor-potentiometer combination is thus applied to the series connected winding 46 and thermistor 28. In addition, since diodes 41 and 51 are coupled to line L2, but are arranged in opposite polarity relationship with respect to each other, each of these diodes is effective to decouple the respective winding to which it is connected, when the opposite winding is being energized from the power source in order to preclude current interaction between the windings.

The illustrated system is arranged such that the temperature maintenance function of the temperature controller portion 22 is not measurably affected by the provision of the indicating means 20 coupled to the heating element 24. More particularly, during alternating current half cycles of the one polarity, when diodes 34 and 41 are forward biased, the silicon controlled rectifier 30 is also forward biased, and a triggering signal may be applied to its gate electrode 32 as a result of current flowing through resistor 36 after the saturable core reactor 40 has been saturated in the corresponding magnetic direction, as explained in the aforementioned U.S. patent. Until such saturation occurs the flow of current to the gate electrode 32 is opposed by the inductive reactance voltage developed in winding 38 due to the increasing magnetic flux in the reactor. After the core has saturated, the winding 38 exhibits a very low impedance and permits triggering current to flow to the gate electrode 32 of the silicon controlled rectifier 30. Upon termination of this half cycle of alternating current applied power the current being supplied to the winding 38 is blocked since the forward bias potential is removed from diode 34 and current is no longer supplied to the gate electrode 32. Similarly, the forward bias is removed from the silicon controlled rectifier 30 and it is rendered nonconductive during the alternating current half cycles of opposite polarity.

On these opposite polarity half cycles heating power is not supplied to the heating element 24 and diodes 48 and 51 are forward biased, with regulated voltage, thus, being applied across the thermistor 28, as well as the winding 46 of the reactor 40. Accordingly, current flows in the winding 46 tending to magnetize the core of the saturable reactor 40 in the opposite magnetic direction. In this regard, the rate at which the magnetic flux increases in the core is a function of the resistance of the thermistor 28, since the regulated voltage applied is divided between the winding 46 and thermistor 28.

It is desirable to produce relatively large changes in the rate at which flux builds up in the reactor core in response to relatively small changes in resistance of the thermistor, caused by temperature change. Thus, the relative values of the resistance of the thermistor at the desired temperature in the zone 26 and the reactance of the winding 46 are selected so that the majority of the total available voltage appears across the thermistor. In addition, the absolute values of the reactance of the winding 46 and the resistance of the thermistor 28 are selected so that the core does not become saturated in the particular magnetic direction, but attains an intermediate magnetization so that the amount of magnetization remains directly related to the resistance of the thermistor at the time in question. Consequently, during alternating current half cycles of the one polarity (triggering half cycles), when the core is being magnetized in the opposite direction it is not necessary to initially remove the core from saturation before initiating magnetization in the opposite direction.

Since the silicon controlled rectifier 30 is not fired until the reactor core is saturated by current flowing in the winding 38, as previously described, and further since the time interval required to attain saturation is dependent upon the previous magnetization of the core effected by the other winding 46, a relationship between that delay and the value of the resistance of the thermistor 28 may be readily seen. The particular value of the resistance of thermistor 28 directly affects the magnetization of the winding 46 and is primarily determinative of the time delay in applying a signal to the gate electrode 32 of the silicon controlled rectifier through the winding 38. Thus, variations in the resistance of thermistor 28 produce corresponding variances in the firing angle of the silicon controlled rectifier 30, thereby adjusting the power supplied to the heating element 24 as a function of the resistance of thermistor 28.

The thermistor 28 preferably has a negative temperature coefficient of resistance and, thus, a decrease in thermistor resistance caused by an increase in temperature effects an increase in the magnetizing current in the winding 46 and results in an increase in the delay in firing of the silicon controlled rectifier during cycles of the one polarity, i.e., the triggering cycles. It may be readily seen that such an increased delay results in less current flowing to the heating element 24 so that the power supplied to the heating element decreases as a result of increasing thermistor temperature, providing a proportional negative feedback for maintaining the temperature in the zone 26 within predetermined limits. In addition, substantial gain is provided by this feedback arrangement since small changes in the resistance of thermistor 28 produce substantially larger changes in the core magnetization. It should also be noted that a particular temperature level may be conveniently provided by merely adjusting the resistance of the potentiometer 54 in order to obtain the desired power flow.

Since the heat sensed by the thermistor 28 exercises a direct control over the amount of heating power supplied to the heating element 24, it may be readily seen that the power supplied to the heating element provides an accurate indication of the actual temperature in the zone 26. Accordingly, the indicating means 20, is connected across the terminals of the heating element 24, which preferably comprises a resistor. By sensing the voltage drop across resistor 24 an indication of the heating power being supplied is provided.

The indicating means preferably comprises a voltage responsive device 60, connected across the resistor 24 for sensing the voltage thereacross. The voltage responsive device 60 is arranged to selectively energize a suitable switch 62, such as a pair of relay contacts, which are serially connected with an indicator 64, preferably comprising an indicator light. Alternatively, if desired the indicator may comprise an appropriate audio indicator, an electrical indicator, etc.

The voltage responsive device 60 preferably comprises a voltage responsive relay coil, which is energized in response to a predetermined voltage developed across the resistor 24 to effect closing of the relay contacts 62, thereby effecting energization of the indicator light 64 and providing a visual display indicative of the amount of heating power being supplied to the resistor 24. In this manner, an indication is provided of the temperature sensed by the thermistor 28.

More particularly, the indicating means 20 includes a filter capacitor 66 connected across the relay coil 60 to prevent chattering of the relay contacts and also includes a Zener diode 68 connected across the coil 60. The Zener diode 68 functions to limit the maximum voltage across the relay coil 60 and thus prevents overloading and possible damage to the coil 60. In addition, it may be noted that one terminal of the Zener diode is connected to one end of the resistor 24, while the other terminal of the Zener diode is connected to the opposite end of the resistor 24 through a serially connected voltage dropping resistor 70 and a protective diode 72. The resistor 70 and diode 72 function to protect the Zener diode 68 from overloads and also to provide a half wave rectified signal to the Zener diode.

In order to provide useful information, it is desirable to correlate the energization of the indicating 20 means with the heating power supplied and hence the temperature in the zone 26. Accordingly, the indicating means 20 is arranged to provide an indication in response to a predetermined voltage developed across the resistor 24. In this regard, it should be noted that heating power is supplied to the resistor 24 only when the temperature in the zone 26 is below the predetermined level, whereas, when the temperature in the zone 26 has reached the desired level, a substantially lower level of heating power is supplied to the heating element 24, as previously explained.

As an example, in one preferred embodiment of the present invention, the indicating means is arranged such that the relay coil 60 is energized to effect closing of the contacts 62 and associated energization of indicator light 64, only when the power being delivered to the resistor 24 is in excess of approximately 80 percent of rated full power. Accordingly, when less than 80 percent of rated power is supplied to the resistor 24, the voltage drop thereacross is insufficient to effect energization or pull-in of the relay coil 60 and the indicator light is not caused to light. It is thus considered that the system is operating properly and within its desired temperature limitations as long as the indicator light 64 is not lit, since this indicates that less than 80 percent of rated power is being dissipated across the resistor 24 and that the temperature in zone 26 has not dropped to a level requiring a relatively large amount of heat input.

On the other hand, when approximately 80 percent or more of rated power is being supplied to the resistor 24, the voltage drop across the resistor is sufficient to effect energization of the relay coil which effects closing of the contacts 62 and lighting of the indicator light 64, thereby indicating to an operator that the temperature in the zone 26 has dropped to too low a level and that a relatively large amount of heat is required from the heating element. Thus, for example, when the system is initially energized and the zone 26 is at a relatively low temperature level, maximum power would be supplied to the resistive heating element 24, effecting turn-on or lighting of the indicator light 64. As the desired temperature level is approached so that the power being supplied to the resistor 24 is reduced and falls below 80 percent of maximum, the voltage across the resistor 24 becomes insufficient to maintain pull-in of the relay coil 60 and the indicator light 64 is no longer energized. Thus, an indication is provided that the desired temperature level has been reached and is being maintained by the system.

Various advantages of such an arrangement are readily apparent. For example, as previously described, an indication is provided that proper temperature level has been reached following initial turn-on of the device. In addition, if the indicator light remains energized, an indication is provided that relatively large amounts of power are being continuously supplied by the heating element. Such an indication might function as a warning that the system is insufficient for the particular application.

It should be noted that the described indicating system is quite versatile and may be conveniently arranged in numerous alternative configurations to provide a desired circuit function. For example, the relay contacts 62 may be normally closed so that the indicator light 14 remains lighted until the relay coil is energized by a relatively large voltage drop across the resistor to effect opening of the contacts. Thus, an indication of high temperature would be represented by an energized light. Similarly, the requirement for a relatively large amount of heat would result in opening of the contacts and provide an indication of low temperature in the zone 26. As the level of heating power being supplied was reduced the indicator light would be energized as the contacts closed. Accordingly, in such a system the light would be normally on during operation as an indication that relatively large amounts of heating power were not required, while the light would go out so as to indicate that large amounts of heat were being supplied to the zone 26. Similarly, the system may be arranged such that different percentages of power supplied to the resistor 24 and sensed by the relay coil effect opening and closing of the contacts so as to provide substantial flexibility in the indication range.

As previously explained, the embodiment illustrated in FIG. 1 provides half wave rectified power to the resistive heating element, i.e., power is supplied to the heating element only during those half cycles of applied alternating current power, during which the silicon controlled rectifier is forward biased by the source of alternating current power. In certain instances, however, it is desirable to provide full wave power to a heating element in a system such as that described in order to provide somewhat more accurate control of the temperature level at which the zone is maintained. It is also advantageous to provide a suitable indicator means for indicating the state of operation of such a system, and such a system is illustrated in FIG. 2.

In the system illustrated in FIG. 2, those elements corresponding to the FIG. 1 embodiment are designated by corresponding reference numerals.

The operation of the embodiment illustrated in FIG. 2 is generally similar to that of FIG. 1 but provides full wave power to the resistive heating element 24. Consequently, heating power is supplied to the heating element 24 during both of the half cycles of applied alternating current power. In order to supply heating power on opposite polarity half cycles, a second silicon controlled rectifier 80 is provided connected in parallel relationship with the silicon controlled rectifier 30. However, the silicon controlled rectifier 80 is arranged in opposite polarity relationship with respect to the silicon controlled rectifier 30 so that each of these respective devices may be rendered conductive on opposite half cycles of applied alternating current power. In this regard, it may be noted that the anode-cathode circuit of the silicon controlled rectifier 80 is coupled between the power line L1 and one end of the heating element 24 similarly to the silicon controlled rectifier 30. In addition, the silicon controlled rectifier 80 also includes a gate electrode 82, which is utilized for selectively triggering the silicon controlled rectifier 80 on the opposite half cycles of applied alternating current power during which the silicon controlled rectifier 30 is nonconductive.

The system illustrated in FIG. 2 is arranged such that the firing angle of silicon controlled rectifier 80 is also dependent upon the temperature sensed by the thermistor 28. More particularly, referring in detail to the illustrated embodiment, on the alternating current half cycles of one polarity, the silicon controlled rectifier 30 is forward biased, and a signal is applied to its gate electrode 32 with the firing angle being a function of the temperature of thermistor 28, as previously explained. However, a portion of the power supplied through the anode-cathode circuit of silicon controlled rectifier 30 to heating element 24 is applied to a charge storage capacitor 84 coupled to the anode-cathode circuit of silicon controlled rectifier 30. The capacitor 84 is charged to a predetermined value dependent upon the level of conduction of the silicon controlled rectifier 30. The charge storage capacitor 84 is also coupled to the gate electrode 82 of the silicon controlled rectifier 80 through a coupling diode 86. The coupling diode 86 is reverse biased when the silicon controlled rectifier 30 is conductive to prevent inadvertent discharge of the capacitor 84, and is forward biased when the silicon controlled rectifier 80 is forward biased so as to provide a discharge path to the gate electrode 82.

In addition, a blocking diode 88 is provided and serially connected with a voltage limiting resistor 90 in order to prevent inadvertent conduction of the diode 86 which might trigger the silicon controlled rectifier 80. A voltage dropping resistor 92 is also connected across the serially connected diode 88 and resistor 90 and across the gate-anode circuit of the silicon controlled rectifier 80 in order to preclude the capacitor 84 from being charged in the reverse direction by current flowing through the winding 38.

In operation, as previously explained, during alternating current half cycles of the one polarity, when silicon controlled rectifier 30 is forward biased the operation of the temperature control device is essentially similar to that described in connection with the FIG. 1 embodiment, except that the capacitor 84 is charged during conduction of the silicon controlled rectifier 30 to a level which is dependent upon the firing angle of the silicon controlled rectifier 30. Thus, the amount of charge stored in the capacitor 84 is a function of the temperature sensed by thermistor 28. The charge stored by the capacitor 84 is, in turn, utilized to control the firing angle of the silicon controlled rectifier 80.

Accordingly, during half cycles of opposite polarity, when the silicon controlled rectifier 30 is reverse biased to a nonconductive condition the silicon controlled rectifier 80 is forward biased, since it is connected to the power lines in reverse polarity relationship with respect to the silicon controlled rectifier 30, as previously described. In addition, blocking diode 88 which is connected between the anode of diode 86 and the power line L1 is reverse biased while the diode 86 is forward biased by resistor 92, so that the capacitor is caused to discharge through the forward biased diode 86, thereby triggering the silicon controlled rectifier 80.

In this connection it may be noted that the level of conduction of the silicon controlled rectifier 80 closely follows that of the silicon controlled rectifier 30 and is also a function of the temperature in zone 26. When silicon controlled rectifier 30 conducts relatively heavily, the amount of charge stored by capacitor 84 is relatively large. Consequently, the capacitor 84 will trigger the silicon controlled rectifier 80 to conduct relatively heavily during opposite polarity half cycles, when silicon controlled rectifier 80 is forward biased. Thus, the firing angle of silicon controlled rectifier 80 closely follows the firing angle of silicon controlled rectifier 30. Similarly, if the silicon controlled rectifier 30 has not been rendered conductive on the previous half cycle of alternating current power, no charge is stored in the capacitor 84. Consequently, the silicon controlled rectifier 80 is not triggered, when it is forward biased, and does not supply power to the heating element 24.

The temperature indicating circuit 96 is coupled to the heating element 24 in a manner somewhat similar to the arrangement of the temperature indicating device 20. The temperature indicating circuit 96 may be arranged to provide various indications of the operation of the temperature control system. For example, in the illustrated embodiment, an indication is provided denoting low temperature, i.e., the supply of a relatively large amount of power to the resistor 24. In addition, an indication is provided denoting high temperature, i.e., the supply of a relatively small amount of power to the resistor 24.

The temperature indicating circuit 96 includes a voltage responsive means 98, such as a relay coil coupled across resistor 24 to sense the power being supplied to the resistor 24. In this regard, the voltage responsive relay coil 98 is connected to one end of the resistor 24, as illustrated, and is coupled to the other end of the resistor 24 through a voltage dropping resistor 100 and a protective rectifier diode 102. In the illustrated embodiment the relay coil 98 is also coupled to a pair of normally open relay contacts 104 which are closed in response to energization of the relay coil 98. In addition, a constant voltage Zener diode 106 is connected across the terminals of the relay coil 98 in order to limit the maximum voltage which can be applied across the coil so as to prevent damage to the coil. A filter capacitor 108 is also connected across the relay coil terminals to preclude chattering of the relay contacts.

In operation, as the power supplied to the resistor 24 exceeds a predetermined level, for example 80 percent of rated power, the voltage responsive relay coil 98 is energized and effects closing of the relay contacts 104. This effects energization of the indicator light 110 and thereby provides a visual indication that relatively large amounts of power are being supplied to the resistor 24 in response to a low temperature in zone 26. Similarly, when the heating power being supplied to the resistor 24 drops below the predetermined level, in the example, 80 percent of rated power, the voltage across the coil 98 is no longer sufficient to maintain the contacts 104 closed and the indicator light is no longer energized.

In the illustrated embodiment a low power indication, corresponding to the existence of a high temperature in zone 26 is also provided. In this connection a voltage responsive means 112 preferably comprising a voltage responsive relay coil similar to the coil 98 is coupled to the control circuitry 22. In the particular example illustrated, the coil 112 is energized, when approximately 20 percent or less of rated power is being supplied to the resistive heating element 24. In this regard, it may be noted that a series circuit is provided from power line L1 through parallel connected silicon controlled rectifiers 30 and 80, resistor 24 and power line L2. The relay coil 112 is arranged such that it senses the voltage drop across the parallel connected silicon controlled rectifiers 30 and 80, as an indication of the voltage drop and hence the power supplied to resistor 24.

More particularly, one terminal of the relay coil 112 is coupled to the power line L1 by a conductor 114, while its opposite terminal is connected to the junction of the resistor 24 and the parallel connected silicon controlled rectifiers 30 and 80 through a conductor 116, a voltage dropping resistor 118 and a protective rectifier diode 120. A constant voltage Zener diode 122 is also connected across the relay coil 112, and a filter capacitor 124 is connected across the relay coil 112 similar to the provision of the Zener diode 106 and capacitor 108 previously described in connection with the relay coil 98. In addition, the relay coil 112 is coupled to a pair of normally open relay contacts 126 so that energization of the coil 112 effects closing of the contacts 126, and thereby energizes the indicator light 110. Thus, in the illustrated embodiment, when approximately 20 percent or less of the rated power is being supplied to the resistor 24, while the remainder is dissipated across the parallel connected silicon controlled rectifiers 30 and 80, the voltage responsive relay coil 112 is energized to effect closing of the contacts 126. As a result, the indicator light 110 is energized to indicate that the temperature in the zone 26 has risen to a relatively high level and that a relatively low level of heating power is being supplied to the resistor 24.

Accordingly, it may be seen that in the illustrated temperature indicating circuit 96, a visual representation of the state of operation of the temperature control system is continuously provided. When the temperature rises to a relatively high level so that a relatively low proportion of the rated power, 20 percent in the illustrated example, is being delivered, an indication is provided by lighting of the indicator light 110. Similarly, when a relatively low temperature occurs in the zone 26 as a relatively high level of heating power, 80 percent of rated power in the illustrated example, is being supplied to the resistor 24, the indicator light 110 is also caused to light.

Thus, the disclosed system provides an indication when relatively low or relatively high temperatures are present in the zone 26. Furthermore, as long as the indicator light does not become lit, an indication is provided that the zone 26 is being maintained at its desired temperature level.

In addition, various modifications of the illustrated temperature indicating system may be conveniently provided. For example, the circuit may be arranged so that the light remains lit or energized during those intervals of time when proper temperature is being maintained in the zone 26 and deenergized when the zone becomes too hot or too cold. Alternatively, the system can be readily arranged such that the light is energized only when the system senses a very high temperature corresponding to low power levels or a very low temperature corresponding to high levels of power being supplied. In addition, the system can be arranged to provide indications of operation corresponding to a desired power level.

Thus, a novel temperature control system in which an indication is visually displayed of the state of operation of the system has been described in detail. Various changes and combinations will be readily apparent to those skilled in the art and are deemed to be within the scope of the present invention as set forth in the appended claims.

I claim:

1. In a temperature control system for maintaining the temperature in a zone to be controlled with predetermined limits including heat generating means in heat exchange relationship with said zone, heat sensing means adapted to sense the temperature in said zone, means for selectively supplying heating power to said heat generating means in an amount systematically related to the temperature sensed by said heat sensing means, and a temperature indicating means electrically coupled to said heat generating means for producing an electrical signal in response to the supply of power to said heat generating means indicative of the level of heating power supplied to said heat generating means and for providing a display in response to said electrical signal, said temperature indicating means including a switch means electrically coupled to said heat generating means and a selectively energizable display indicator coupled to said switch means, said switch means being responsive to a predetermined level of heating power supplied to said heat generating means for energizing said display indicator.

2. In a temperature control system for maintaining the temperature in a zone to be controlled within predetermined limits including heat generating means comprising a resistor in heat exchange relationship with said zone, heat sensing means adapted to sense the temperature in said zone, means for selectively supplying heating power to said heat generating means in an amount systematically related to the temperature sensed by said heat sensing means; and a temperature indicating means electrically coupled to said heat generating means for producing an electrical signal indicative of the level of heating power supplied to said heat generating means and for providing a display in response to said electrical signal, said temperature indicating means including a switch means electrically coupled to said heat generating means and a selectively energizable visual indicator coupled to said switch means, said switch means being responsive to a predetermined level of heating power supplied to said heat generating means for energizing said visual indicator, and including a selectively energizable relay coil connected across said resistor and a pair of associated relay contacts coupled thereto, said relay contacts being connected to said visual indicator, whereby energization of said relay coil is effective to energize said visual indicator.

3. In a temperature control system for maintaining the temperature in a zone to be controlled within predetermined limits including heat generating means comprising a resistor in heat exchange relationship with said zone, heat sensing means adapted to sense the temperature in said zone, means for selectively supplying heating power to said heat generating means in an amount systematically related to the temperature sensed by said heat sensing means; and a temperature indicating means electrically coupled to said heat generating means for producing an electrical signal indicative of the level of heating power supplied to said heat generating means and for providing a display in response to said electrical signal, said temperature indicating means including a switch means electrically coupled to said heat generating means and a selectively energizable visual indicator coupled to said switch means, said switch means being responsive to a predetermined level of heating power supplied to said heat generating means for energizing said visual indicator, said switch means including a rectifier and a Zener diode coupled to said resistor for providing a substantially constant voltage in response to the establishment of said predetermined level of heating power across said resistor, a voltage responsive relay coil connected across said Zener diode, and a pair of associated relay contacts coupled to said relay coil, said relay contacts being connected to said visual indicator for rendering said visual indicator operative in response to energization of said relay coil.

4. In a temperature control system for maintaining the temperature in a zone to be controlled within predetermined limits including a heating element for supplying heat to said zone, a selectively energizable semiconductor switch means for supplying heating power to said heating element, a thermistor adapted to sense the temperature in said zone, first circuit means connected to said thermistor, said first circuit means being operable in a manner responsive to the temperature of said thermistor, second circuit means magnetically coupled to said first circuit means, said second circuit means being coupled to said semiconductor switch means for energizing said semiconductor switch means in response to operation of said first circuit means so as to vary the power supplied to said heating element in a manner dependent upon the temperature of said thermistor; and a temperature indicating means coupled to said heating element for providing a display indicative of the heating power being supplied to said heating means, said temperature indicating means including a visual indicator and a selectively energizable power sensing means connected to said heating element and to said visual indicator, said power sensing means being adapted to activate said visual indicator in response to the supply of a preselected level of heating power to said heating element.

5. In a temperature control system in accordance with claim 4 wherein said heating element comprises a resistor and said power sensing means comprises a set of relay contacts and a voltage sensitive relay coil electrically connected to said resistor and operatively coupled to said relay contacts, said relay contacts being electrically coupled to said visual indicator to effect activation thereof in response to energization of said relay coil.

6. In a temperature control system for maintaining the temperature in a zone to be controlled within preselected limits, having a resistive heating element in thermal communication with said zone for supplying heat thereto, a selectively energizable semiconductor switch means connected between a power source and said resistive heating element for controlling the flow of heating power to said resistive heating element, a thermistor in thermal communication with said zone for sensing the temperature of said zone, circuit means coupled to said thermistor and to said semiconductor switch means, said circuit means energizing said semiconductor switch means in accordance with the level of temperature sensed by said thermistor so as to energize said semiconductor switch and couple said resistive heating element to the source of heating power as the sensed temperature decreases and deenergize said semiconductor switch means and preclude the flow of heating power to said resistive heating element as the sensed temperature increases, and a temperature indicating means electrically connected to said resistive heating element for sensing the heating power supplied to said resistive heating element and providing a display representative of the amount of heat provided by said resistive heating element as an indication of the temperature sensed by said thermistor, said temperature indicating means comprising a selectively energizable visual indicator, at least one pair of relay contacts for selectively coupling the power source to said indicator, and a voltage responsive relay coil operatively connected to said contacts and coupled to said resistive heating element, said relay coil being adapted to control the opening and closing of said contacts in response to the voltage developed across said resistive heating element.

7. In a temperature control system for maintaining the temperature in a zone to be controlled within predetermined limits including a resistive heating element adapted to supply heat to said zone, a first and a second selectively energizable silicon controlled rectifier for selectively connecting a source of alternating current electrical power to said resistive heating element, said first and second silicon controlled rectifiers being connected in opposite polarity relationship with respect to each other so as to each selectively connect the power source and said resistive heating element during respective alternating current half cycles of opposite polarity through its associated anode-cathode circuit, a thermistor in thermal communication with said zone for sensing the temperature of said zone, circuit means coupled to said thermistor and to said first silicon controlled rectifier for selectively triggering said first silicon controlled rectifier during alternating current half cycles of one polarity in accordance with the temperature sensed by said thermistor, power storage means coupled to the gate electrode of said second silicon controlled rectifier and to the anode-cathode circuit of said first silicon controlled rectifier for storing power during conduction of said first silicon controlled rectifier in an amount controlled by the level of conduction of said first silicon controlled rectifier, said power storage means being adapted to selectively trigger said second silicon controlled rectifier during alternating current half cycles of an opposite polarity in accordance with the level of power stored therein, and a temperature indicating circuit electrically coupled to said resistive heating element for sensing the heating power being supplied to said resistive heating element so as to provide a display representative of the amount of heating power being supplied to said resistive heating element as an indication of the temperature sensed by said thermistor, said temperature indicating circuit comprising a visual indicator, switch means for selectively coupling the source of power to said visual indicator, and a switch energizing means connected to said resistive heating element for selectively energizing said switch means in response to the heating power supplied to said resistive heating element.

8. In a temperature control system in accordance with claim 7 wherein said power storage means comprises a capacitor, said switch means comprises at least two pairs of parallel connected relay contacts adapted to energize said visual indicator, and said switch energizing means comprises first and second voltage responsive relay coils each operatively connected to a respective pair of said relay contacts to control the opening and closing of said contacts in response to the voltage developed across the associated relay coil.

9. In a temperature control system in accordance with claim 7 wherein said power storage means comprises a capacitor, said switch means comprises at least two pairs of parallel connected relay contacts adapted to energize said visual indicator, and said switch energizing means comprises a first voltage responsive relay coil connected across said resistive heating element and a second voltage responsive relay coil coupled to said resistive heating element and connected across said parallel connected first and said second silicon controlled rectifiers, said first and second relay coils each being operatively connected to a respective pair of said relay contacts to control the opening and closing of said contacts in response to the voltage developed across its associated relay coil.